May 13, 1958 T. H. STIEBEL 2,834,869
TEMPERATURE CONTROLLED REGULATOR SWITCH HAVING
MEANS LIMITING DRY-RUN HEATING AND PREVENTING
SUBSEQUENT ENERGIZATION OF ELECTRIC
HEATERS FOR LIQUIDS

Filed July 20, 1956 3 Sheets-Sheet 1

INVENTOR THEODOR H. STIEBEL
BY
ATTORNEY

May 13, 1958  T. H. STIEBEL  2,834,869
TEMPERATURE CONTROLLED REGULATOR SWITCH HAVING
MEANS LIMITING DRY-RUN HEATING AND PREVENTING
SUBSEQUENT ENERGIZATION OF ELECTRIC
HEATERS FOR LIQUIDS
Filed July 20, 1956  3 Sheets-Sheet 2

INVENTOR
THEODOR H. STIEBEL
BY
ATTORNEY

May 13, 1958 T. H. STIEBEL 2,834,869
TEMPERATURE CONTROLLED REGULATOR SWITCH HAVING
MEANS LIMITING DRY-RUN HEATING AND PREVENTING
SUBSEQUENT ENERGIZATION OF ELECTRIC
HEATERS FOR LIQUIDS
Filed July 20, 1956 3 Sheets-Sheet 3

INVENTOR THEODOR H. STIEBEL
BY
ATTORNEY

United States Patent Office 2,834,869
Patented May 13, 1958

2,834,869

TEMPERATURE CONTROLLED REGULATOR SWITCH HAVING MEANS LIMITING DRY-RUN HEATING AND PREVENTING SUBSEQUENT ENERGIZATION OF ELECTRIC HEATERS FOR LIQUIDS

Theodor H. Stiebel, Holzminden, Weser, Germany

Application July 20, 1956, Serial No. 599,143

5 Claims. (Cl. 219—44)

The instant invention relates broadly to electric heaters for liquids of the immersion type, and more particularly to automatic switches therefor of which the actuation is controlled by a heat sensitive element to disconnect the electric line supply from the heating coil when the heating coil with the liquid being heated has reached a first predetermined temperature and, preferably, to reconnect the line supply to the heating coil when the heated liquid has cooled to second predetermined and lower temperature.

An object of my instant invention is to provide an automatic switch for electric heaters of the immersion type in which the possibility of having the heating coil damaged or even burn out because there is no liquid but only air, a relatively poor conductor of heat, about the coil is completely eliminated.

A further object of my invention is so to construct the temperature responsive element controlling the switch that it is at all times in direct heat conductive engagement with the heating coil of electric heaters for liquids.

Still a further object of my invention is to provide a temperature controlled switch for such electric heaters in which the temperatures at which actuation, both disconnect and connect, are readily preset and adjusted to desired values.

Still another object of the invention is to provide an automatic switch that is readily adjustable either to disconnect the line supply from the heating coil once, and once only, after the switch has been actuated manually to its connect position, or to disconnect and reconnect repeatedly and automatically after an initial manual actuation to such connect position.

Still another object is to provide an automatic temperature regulator which functions at each of two predetermined temperatures, which are manually adjustable, to continue to disconnect the heating coil at the higher, and to connect at the lower, of the two predetermined temperatures as long as the heating coil is immersed in liquid to be heated, and so disconnects the heating coil when it runs dry that the heating is not reconnected at the lower temperature on cooling of the coil, unless the regulator is manually actuated to the reconnect position.

I accomplish the foregoing, and other obvious, objects of my invention by connecting the heat responsive element, for example a bimetal spring, to the heating coil directly also by way of a heat conductive bridge which has an inherent time lag or delay in transmitting heat to the responsive element and by providing a self-latching mechanism for the heat responsive element which is at such distance from the latter that the self-locking mechanism is actuated to its locking position by the heat responsive element only when the heating coil runs dry by the deflection of the heat responsive element in a magnitude beyond the deflection at which the switch disconnect position is reached. As a result of the time delay in the transmission of heat by the bridge connecting a limited area of the heat responsive element to the heating coil, it follows that at the time of disconnection by the switch the heating coil has reached a far higher temperature than would be the case normally, that is, with the warmed liquid, a relatively good conductor of heat as compared to air, immersing both the coil and the temperature responsive element. This increase of temperature during the interval of such lag, particularly after the disconnection of the line current from the heating coil, is transmitted to the temperature responsive element and thus deflects the latter additionally until it automatically actuates the latching mechanism to latch. The heat responsive element remains in the locked and hence inactive position during its subsequent cooling, thereafter preventing any automatic reconnection or closure of the switch and any temperature control activity. The latching mechanism is so constituted that manual actuation in the direction opposite to the latching force restores it to its pre-operated condition. Thus, the deflection or curving of the free region of the temperature responsive element with increasing temperature consists of two portions, the first being the span from its position at room temperature to that at the moment of disconnecting the heating coil, and the second being that caused by the lagging transmission of heat thereto after such disconnection. Obviously the temperature at which this change in the mode of operation from regulator to disconnect switch occurs, depends on the magnitude of such delayed heat transmission. To have such automatic latching, it is required that the distance which the temperature responsive element moves from its room temperature position to its position at the moment of switch opening, plus the distance moved as the result of the heat subsequently applied to it, must be larger than the distance at room temperature between the temperature responsive element and its self-latching mechanism. To permit adjustment of the temperature at which this change in the mode of operation takes place, a preferred embodiment of the instant invention provides manually operable means for displacing the latching mechanism relative to the temperature responsive element.

The foregoing, as well as other obvious, objects and features of my instant invention will be understood more clearly from the following detailed description of an illustrative embodiment and a modification thereof, taken in conjunction with the appended drawing in which.

Figure 1:
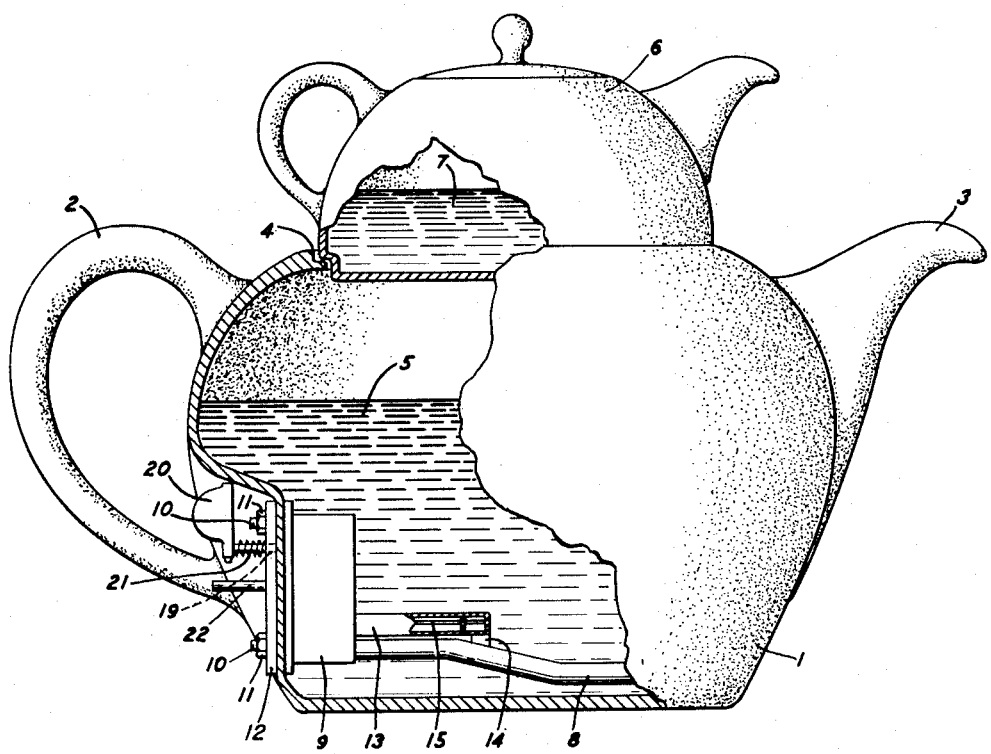
Figure 1 is an elevational view, partially broken away, of an electrically heated kettle, for example for preparing and keeping tea warm, showing the spatial arrangement therein of an illustrative embodiment of the controller-switching device of the instant invention.
Figure 6:
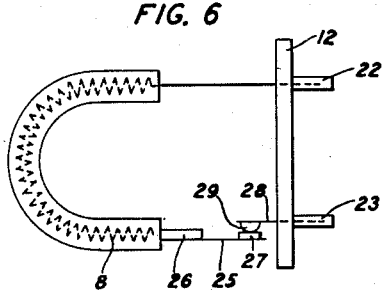
Figure 6 is a circuit schematic of the controller-switch and the heating element or coil.

The universal household kettle 1 shown in Figure 1 is provided with a handle 2, a pouring spout 3, and an open top 4 through which the kettle may be filled, for example with water 5. The open top 4 is adapted to support a small kettle 6 containing, for example, tea extract 7. The tubular heating element 8 is positioned in the interior bottom region of the kettle 1, extending from a liquid tight housing 9 containing the elements of the controller-switch of my instant invention. The housing 9 is affixed to a lower portion of the wall of kettle 1 by any known means, for example by a plurality of bolts 10 extending liquid tight through the wall portion and having nuts 11 on their external ends by means of which a terminal cover 12 is clamped to the external wall surface. A protective, preferably rectangular, tube 13 closed at its free end, also extends from housing 9 into the interior, water filled, region of the kettle spaced from the heating element 8, and is supported near its free end by a small, heat conductive, bridge or block 14 which, in turn, is supported on the external sheath of the heating element 8. One end of the bimetal plate spring 15 is connected integrally to the interior surface of the closed end so that the spring is free to bend transversely within the tube the remainder of the length of the protective tube. As shown in Figure 1, the fixed end of plate spring 15 is attached to the upper interior region of the closed end of tube 13, the plate spring thus having adequate clearance to bend downwardly the length of the tube. It follows that the metal of the bimetal plate 15 with the greater coefficient of temperature expansion is uppermost in Figure 1. The spring 15 itself extends into the housing 9 and has a central tongue 16 at its free end region and a pair of opposite and laterally aligned extensions, 17 and 18, within the housing 9 (Figures 2 through 5). Extending from within the housing, a shaft 19 projects through the kettle wall and the terminal cover 12, to the exterior of the kettle and at its external end has affixed thereto a lever 20. The shaft 19 with lever 20 may be displaced in the axial direction of shaft 19 for a purpose hereinafter described, and, to keep them in a normal position spaced from the kettle wall, a spiral spring 21 about the projecting portion of shaft 19 is braced between the cover plate 12 and the lever 20. A pair of pin terminals, 22 and 23, extending from the cover plate and electrically connected to the heating coil (Figure 6), is for connection to the line current supply source.

Referring to Figures 2 through 5, the spacer member or rod 24, of insulating material, is connected to and supported on the tongue 16, the upper end of rod 24 being connected to the intermediate region of the lower surface of a plate spring 25, of electrically conductive material and affixed at one end to the conductor 26 of the heating element 8. The free end region of spring 25 carries an electrically conductive contact 27. The portion of the terminal 23 extending through the cover plate 12 and into the housing 9, has affixed thereto one end of the electrically conductive plate spring 28 (Figures 2 and 6) carrying the conductive contact 29 on the lower surface of its free end and adapted to engage and disengage contact 27. Integrally on the rotatable shaft 19 and within the housing 9, a cylinder 30 of electrically insulating material has an eccentric camming surface portion 31 in its cylindrical surface of a width adequate both to engage the upper end of spacing member 32 as also to permit axial displacement of shaft 19 to a limited and required amount. The spacing member 32 is slidingly supported in the cover 12 and with its upper end bears against the cam surface 31 while bearing with its lower end against the upper surface of the spring 28 to flex the latter. The camming portion 31 extends for about a semi-circumference with its lowermost, or radially innermost, portion substantially central thereof, the cylinder 30 being so positioned on shaft 19 that such lowermost region and the axis of lever 20 are aligned, that is, with the lever 20 horizontal and to the right (Figures 2 through 4) the lowermost cam surface is subtended by the horizontal radius to the left.

On pushing the lever 20 inwardly against the tension of the spring 21, the inner end of shaft 19 is positioned to strike against the upper arm 33 of the formed lever 34 pivoted at its intermediate region on the knife edge 35 integral with a wall of housing 9. The lower arm 36 of lever 34 has a pair of spaced projecting lugs, 37 and 38, between which the tongue 16 of the bimetal spring 15 extends. The lever 34 is so positioned that its lower arm 36 is in the region defined by the planes of the spacer rod 24 and the bimetal lateral extensions 17 and 18. A formed wire spring 39, of which one end is affixed to the wall of housing 9, presses the lower lever arm 36 so that normally its lugs 37 and 38 rest against the bimetal projections 17 and 18.

The operation of the instant controller-switching mechanism is as follows: For and during heating of the water within the kettle, the controller-switch is closed by rotating the lever 20 to the right until it is horizontal (as in Figures 2 through 5), simultaneously pushing the shaft 19 inwardly against the tension of spiral spring 21, and then releasing it. Since the bimetal spring 15 and its integral tongue 16 are thus in their uppermost position, and hence by way of spacer rod 24 also the free end of spring 25, and the free end of spring 28 is pressed downwardly under tension by way of spacer rod 32, cylinder 30 and cam surface 31, the contacts 27 and 29 engage each other and close the line circuit to the heating element 8. The engaging contacts 27 and 29 result in the circuit: one side of line supply to terminal 22, heating coil 8, heating coil end 26, spring 25, contact 27, contact 29, terminal 23 and the other side of the line supply.

On reaching the boiling point of the water within the kettle, as also on emptying the kettle of water before or after it has reached the boiling point or when the water has been boiled away, that is the heating element runs dry, the instant controller-switch is to disconnect finally the line supply from the heating element. Furthermore, after the tea extract in the small kettle 6 has been brewed by using some of the boiling water from kettle 1, and the cups which have been set out have been filled with tea extract and sufficient boiling water to meet the particular consumer's taste, it is desirable to maintain both the remaining tea extract and water in the respective kettles at a predetermined temperature, below boiling, by regulating the electrical energy supplied to the heating coil.

As the temperature of the water increases, the heat thereof is imparted to the bimetal spring 15 by way of the protective tube 13 immersed therein. Hence the free portion thereof curves increasingly downwardly, the tongue 16 carrying the spring 25 downwardly with it through spacer rod 24. The free end region of the tensioned plate spring 28, of which the contact 29 engages the contact 27, thus follows the free end of spring 25 downwardly without the engagement between the contacts 29, 27 being broken, that is, the line supply remains connected to the heating element, until such time as the tension on the spring 28 due to the rod 32 pressing thereon is completely relieved. At such time the contact 29 no longer moves downwardly and cannot follow the further downward movement of contact 27, thus opening the connection to the heating coil.

With the kettle contents boiling away or the heating element going dry, there is a markedly more-rapid increase in the temperature of the heating coil. The transmission of heat from the heating coil to the bimetal spring 15 is now no longer predominantly by way of the water but by air with some heat transmitted by the small metal bridge or block 14, even when the protective tube 14 above the heating coil alone runs dry somewhat ahead of the heating coil running dry. Due to the time lag involved in the heat transmission by block 14 from the heating coil to the bimetal spring 15, there is a further slight increase in the temperature of the heating element after the regulator-switch has moved to its open position, the heat of which transmitted to the bimetal spring deflects it still further so that the projecting lugs 37, 38 of the lower lever arm 36 clear the lateral tongue extensions 17, 18. At this moment, under the tension of wire spring 39, the lower lever arm 36 is pushed so that the lugs 37, 38 are above the lateral projections 17, 18 (Figure 4). Hence, as the bimetal spring 15 cools, it cannot return to its original and preoperated position again to engage contact 27 with contact 29 since the lugs are in the path of upward movement of the lateral projections 17, 18. The bimetal spring 15 thus resiliently latches the switch against automatic closure. Renewed closure of the circuit is now possible only by pressing against the upper arm 33 of lever 34, which manual operation comprises pressing lever 20 inwardly against the tension of spiral spring 21. The inner end of shaft 19 thus pressing against the arm 33, pivots the lever 34 about its knife edge support 35 to bring the lower arm 36 forwardly (Figures 2 to 5) so that the lugs 37, 38 clear and are out of the upward path of lateral projections 17, 18. The cooled metal spring 15, now free to move, restores to its preoperated position with the lugs 37, 38 pressed backwardly against the projections 17, 18 by the wire spring 39.

Figure 2:
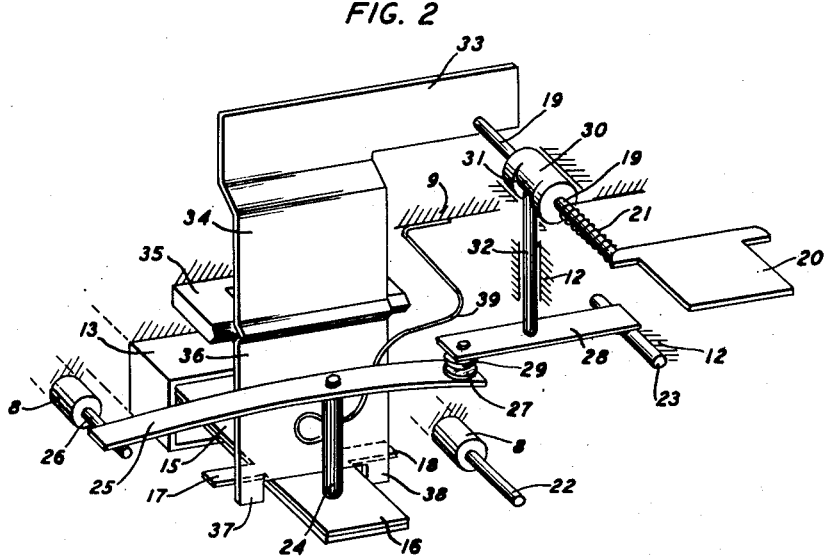
Figure 2 is a perspective schematic of the illustrative embodiment per se with the liquid tight housing thereof removed, and with the movable elements thereof in the position they occupy while the water content of the kettle is being heated.
Figure 3:
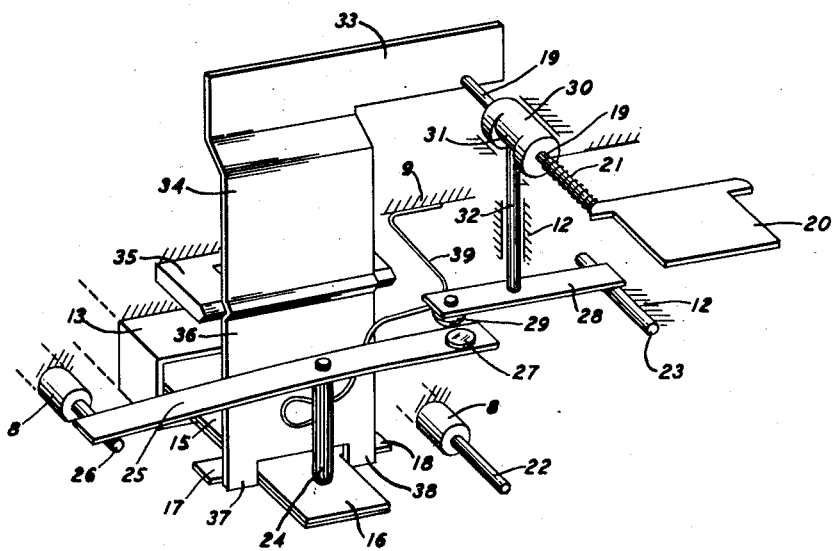
Figure 3 is like Figure 2 but shows the elements immediately after the switch has opened the circuit from the line supply to the heating element.
Figure 4:
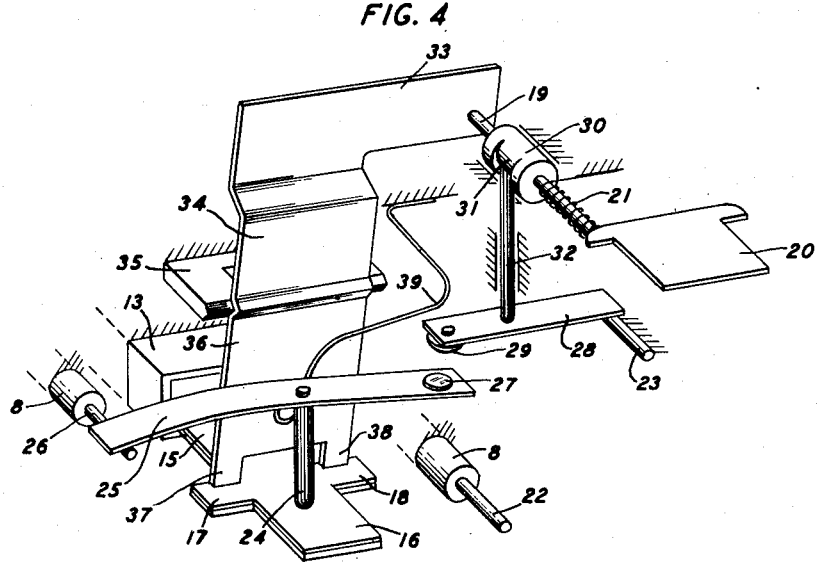
Figure 4 is likewise like Figure 2 and shows the elements in the final latched position in the circuit opening switch position.

For maintaining the kettle contents at a desired predetermined temperature lower than boiling, the lever 20 is rotated counterclockwise to a greater or lesser degree from the horizontal position shown in Figures 2 through 4 toward the vertical position shown in Figure 1. Doing so rotates the camming surface 31 of the cylinder 30 from the position of maximum downward displacement of spacer member 32 to that of minimum downward displacement thereof (lever 20 vertical) or to positions intermediate therebetween. Thus the spring 28 is tensioned progressively less, and the contact 29 hence follows the downward movement of contact 27, produced by the tongue 16 of the bimetal spring 15, for a correspondingly smaller distance, causing disengagement of the contacts 27 and 29 at correspondingly lower temperatures. At such rotated positions of the lever 20, automatic restoration and reconnection may take place with kettle water immersing tube 13 and coil 8 when the bimetal spring 15 has cooled. As compared to its deflection at boiling temperature and on the heating element running dry, the deflection of spring 15 for the interval from cold water to the lower temperature of maintaining the water hot but not boiling is considerably less. The total deflection, including that resulting from the delayed transmission of heat thereto above mentioned, is now such that it no longer results in the release of the lower lever arm 36, or more specifically its lugs 37, 38 from the lateral tongue projections 17, 18, followed by the subsequent latching thereof in the open switch position. Hence as the bimetal spring cools after the heating circuit is opened, it can and does freely return to its preoperated position, carrying the free end region of the spring 25 upward and reengaging contact 27 ultimately to contact 29 to close the heating circuit. On again reaching the higher of the two predetermined temperatures, the bimetal spring has again reached a magnitude of deflection sufficient to disengage contact 27 from contact 29, and this cycle continues to repeat itself just so long as the heating element does not run dry. For, even though the controller-switch is adjusted for automatic control, when the kettle does run dry the time delay in the transmission of heat to the bimetal spring from the appreciably increased temperature of the dry running heating element produces the correspondingly increased deflection of the bimetal spring and the latching, as has above been described.

Figure 5:
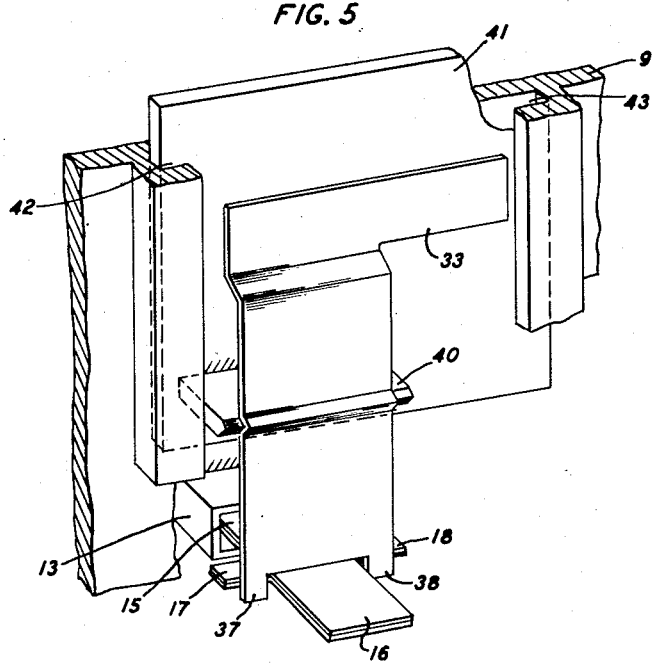
Figure 5 is a perspective schematic of a modification of the embodiment of Figures 2 through 4 in which the controller-switch is adjustable to latch in the circuit opening position at any desired temperature below the boiling point of the liquid in the kettle.

In Figure 5 is shown a modification of the illustrative embodiment above described, in which, while the other elements thereof are unchanged and hence many of them are not shown in Figure 5 for clarity of the showing, the knife edge 40 about which the lever 34 is pivoted is integral with a plate 41 slidable in the guide grooves 42 and 43 in the wall of housing 9. By sliding the plate 41 in its guide grooves upwardly, for example, the distance between the lower edges of lugs 37, 38 and the tongue 16 is decreased, thus providing manual adjustment thereof either before or during the operation of the device. By decreasing such distance, the projecting lugs 37, 38 are so positionable that the deflection of the bimetal tongue 16 at the desired and predetermined temperature below the boiling point, is such as to release the lugs from the lateral projections and to latch the bimetal spring in the circuit opening positioning when the predetermined temperature has once been reached. Thus by making such distance adjustable, the controller switch of my instant invention may selectively be caused to function as a circuit opener only at any desired temperature up to and including the temperature of boiling.

It is to be expressly understood that the embodiment and modification which I have described in detail is by way of illustration only and in no manner is limitative. Various modifications will suggest themselves to the worker in the art without departing from the spirit and scope of the invention.

What I claim is:

1. Temperature controlled switch for electric heaters for liquids comprising an electric heating coil for heating a body of liquid, a housing immersed into the body of liquid, a temperature responsive bimetal plate spring within the housing, the bimetal plate spring having a free end region which is increasingly deflected with increasing temperature, the spring having also a pair of laterally aligned projections at its free end region, a pair of electrically conductive switch members engageable with each other to connect a source of electrical energy to the heating coil, a connector interconnecting the bimetal plate spring and one of the pair of switch members to move it in the direction of disengagement from the other of the switch members with increasing temperature of the bimetal plate spring and to disengage such one switch member from the other when the bimetal plate spring is at a predetermined temperature, a heat conductive body directly connects a limited area of the heating coil to the housing to transmit heat to the bimetal plate spring with a time delay, and an automatically operating latching means cooperating with the bimetal plate spring is at such distance from the latter that only when the heating element runs dry does the latching means operate to latch the one switch member to its disengaging position, the automatically operating latching means comprising a pivoted two-armed lever, a recess in the free end of one arm of the lever through which the free end of the plate spring normally extends, a spring pressing the free end of the one arm against the laterally, aligned projections when the plate spring extends through the recess and beyond the projections when the plate spring is deflected out of the recess, and a stop means in the path of movement of the two-armed lever limiting the movement of the free end of the one arm on deflection of the plate spring out of the recess to a position in which the return of the plate spring into the recess is blocked.

2. Temperature controlled switch according to claim 1 in which the stop means is manually movable to pivot the two-armed lever against the spring pressing the one arm to restore the one arm to its position against the laterally aligned projections with the bimetal plate spring extending through the recess.

3. Temperature controlled switch according to claim 1 in which the two-armed lever is movable laterally of itself to vary the distance at room temperature between the free end of the one arm of the two-armed lever and the bimetal plate spring.

4. Temperature controlled switch according to claim 1 in which at room temperature the bimetal spring is substantially horizontal and the two-armed lever is substantially vertical, and the vertical distance between the free end of the one arm and the bimetal spring is less than the magnitude of deflection of the bimetal spring at the boiling temperature of the liquid.

5. Temperature controlled switch according to claim 1 in which at room temperature the bimetal spring is substantially horizontal and the two armed lever is substantially vertical, and the vertical distance between the free end of the one arm of the two-armed lever and the bimetal spring is greater then the magnitude of deflection of the bimetal spring at the temperature below boiling temperature at which the liquid is to be maintained.

References Cited in the file of this patent

UNITED STATES PATENTS

| | | |
|---|---|---|
| 1,914,334 | Stoddard | June 13, 1933 |
| 2,274,930 | Newton | Mar. 3, 1942 |
| 2,519,432 | Brown | Aug. 22, 1950 |